(12) United States Patent
VanKouwenberg (10) Patent No.: US 6,200,428 B1
(45) Date of Patent: Mar. 13, 2001

(54) WASTEWATER TREATMENT APPARATUS AND METHOD

(76) Inventor: Raymond E. VanKouwenberg, 7 Sunleaf Dr., Penfield, NY (US) 14526

( * ) Notice: Subject to any disclaimer, the term of this patent is extended or adjusted under 35 U.S.C. 154(b) by 0 days.

(21) Appl. No.: 09/052,385

(22) Filed: Mar. 31, 1998

Related U.S. Application Data

(60) Provisional application No. 60/043,079, filed on Apr. 7, 1997.

(51) Int. Cl.[7] .............................. B01D 1/14; B01D 3/10; B01D 1/16; B01D 3/42; C02F 1/12
(52) U.S. Cl. .............................. 202/160; 110/238; 122/7; 202/176; 202/181; 202/205; 202/206; 202/233; 202/236; 159/4.02; 159/4.1; 159/16.2; 159/29; 159/23; 159/44; 159/46; 159/47.3; 159/48.1; 159/DIG. 16
(58) Field of Search .............................. 202/176, 160, 202/18, 1, 166, 185.3, 200, 205, 181, 234, 236, 206, 233; 159/47.3, 48.1, 46, 44, DIG. 16, 16.2, 4.02, 38, 23, 4.1, 29, DIG. 40; 203/10, 11, 91, 1, 2, 49, 100, 90, 21, DIG. 8; 122/7; 110/238

(56) References Cited

U.S. PATENT DOCUMENTS

| | | | | |
|---|---|---|---|---|
| 0,974,475 | * | 11/1910 | Daniels .............................. | 159/38 |
| 1,358,165 | * | 11/1920 | Kreutter .............................. | 159/38 |
| 4,600,474 | * | 7/1986 | Korenowski ....................... | 159/47.3 |
| 5,032,230 | * | 7/1991 | Shepherd .............................. | 202/176 |
| 5,582,680 | * | 12/1996 | VanKowenberg et al. ............ | 159/44 |
| 5,695,614 | * | 12/1997 | Harding et al. ....................... | 203/10 |
| 5,772,843 | * | 6/1998 | Rhodes .............................. | 159/38 |

FOREIGN PATENT DOCUMENTS

4314990  *  11/1994   (DE) .............................. 159/47.3

* cited by examiner

Primary Examiner—Virginia Manoharan
(74) Attorney, Agent, or Firm—Jaeckle Fleischmann & Mugel, LLP (57) ABSTRACT

Wastewater treatment apparatus having a fluid receiving vessel for collecting and heating wastewater to a temperature below boiling, a superheated vaporizing chamber and at least one spray head to spray wastewater into the vaporizing chamber for conversion of the wastewater to vapor to be withdrawn from the apparatus, with the contaminants in the wastewater collected in the apparatus for separate removal.

20 Claims, 8 Drawing Sheets

WASTEWATER TREATMENT APPARATUS AND METHOD

FIELD OF THE INVENTION

Wastewater cleaning apparatus that reduces the volume of wastewater required for disposal by an efficient water evaporation and waste residue collection design. Priority of U.S. Provisional Application Serial No. 60/043,079, filed Apr. 7, 1997, is claimed.

BACKGROUND OF THE INVENTION

Good manufacturing processes, concern for the environment, and changes in environmental practices and regulations all have created additional needs in handling waste fluids after manufacturing and cleaning operations. These needs are especially important when water based mixtures containing pollutants such as greases, oils, soaps, heavy metals, road film and carcinogens collect during the operation. Whereas in the past it was acceptable merely to dump such waste liquids in the ground or in sewer systems, current good manufacturing practices and environmental laws and regulations now severely discourage and/or prohibit such practices. Although very laudable in intent, the result can be very costly, especially to small manufacturers and to business operators who must use substantial quantities of water in their operations, as for example the cleaning and degreasing of manufactured parts, such as metal products, and the cleaning and maintenance of vehicles and other machines that by their nature will shed greases and oils and often detergents and road film with the wastewater.

An example of a wastewater treatment apparatus is disclosed in U.S. Pat. No. 5,582,680 (issued Dec. 10, 1996) by Vankouwenberg. Vankouwenberg discloses a compact, self-contained apparatus for treating wastewater containing, as impurities and pollutants, various non-volatile (the boiling point of water) fluids such as greases, oils, road films, carcinogens and detergents. The apparatus comprises a reservoir for collecting the wastewater with automatic shut-off protection at high and low fluid levels, a heating means surrounding the reservoir to heat the wastewater admixture in the reservoir to boil off the water, a collection means to draw off the non-volatile fluids from the water reservoir during operation of the apparatus, and an automatic refill/shutdown means of the apparatus. Although a very useful, economical and operable apparatus, Vankouwenberg, as with other techniques, may not necessarily be the most efficient use of heat. Moreover, for certain applications, particular impurities sometimes may cause the wastewater to foam excessively when the water reaches its boiling temperature, thus requiring a temporary shut down to remove the excess foam. Each shut down of the apparatus can be a loss of time, labor and heat.

It is therefore an object of this invention to provide an apparatus for treating wastewater wherein efficiency of heat use is a priority.

It is another object of the invention to provide an apparatus that is highly efficient in wastewater treatment.

It is another object of this invention to provide an improved apparatus for treating wastewater by evaporation and for recovery of non-volatile fluids and other contaminants, using conventionally available materials and components that are easy and safe to operate and provide an efficient use of heat.

It is yet another object of this invention to provide an apparatus that may recycle purified water after treatment of the wastewater.

SUMMARY OF THE INVENTION

In accordance with this invention, there is provided a compact, self-contained apparatus for treating wastewater containing, as impurities and pollutants, various non-volatile (at water's boiling point) fluids such as greases, oils, road films, carcinogens and detergents that solves these objectives, as for example, by being capable of evaporating wastewater at a rate of about ten gallons for each 100,000 BTUs per hour of heat energy, or preferably about 40 gallons of wastewater per hour at about 400,000 BTUs per hour. The apparatus comprises a wastewater vessel for receiving the wastewater from a supply source, and heating the wastewater admixture to a temperature just below boiling. The heated wastewater is transferred to a spray chamber that converts the water of the wastewater admixture to vapor, which then is withdrawn from the apparatus. The non-volatile contaminants of the wastewater admixture are collected in the apparatus for separate removal. In another embodiment, additional wastewater is delivered from the supply source directly to the spray chamber for conversion to vapor.

BRIEF DESCRIPTION OF THE DRAWINGS

The present invention will be more fully understood by reference to the following detailed description thereof and the attached drawings, in which like reference numerals refer to like elements, and wherein:

FIGS. 8b and 8c are partial views of portions of the system of FIG. 8a;

DETAILED DESCRIPTION OF THE INVENTION

Figure 1:
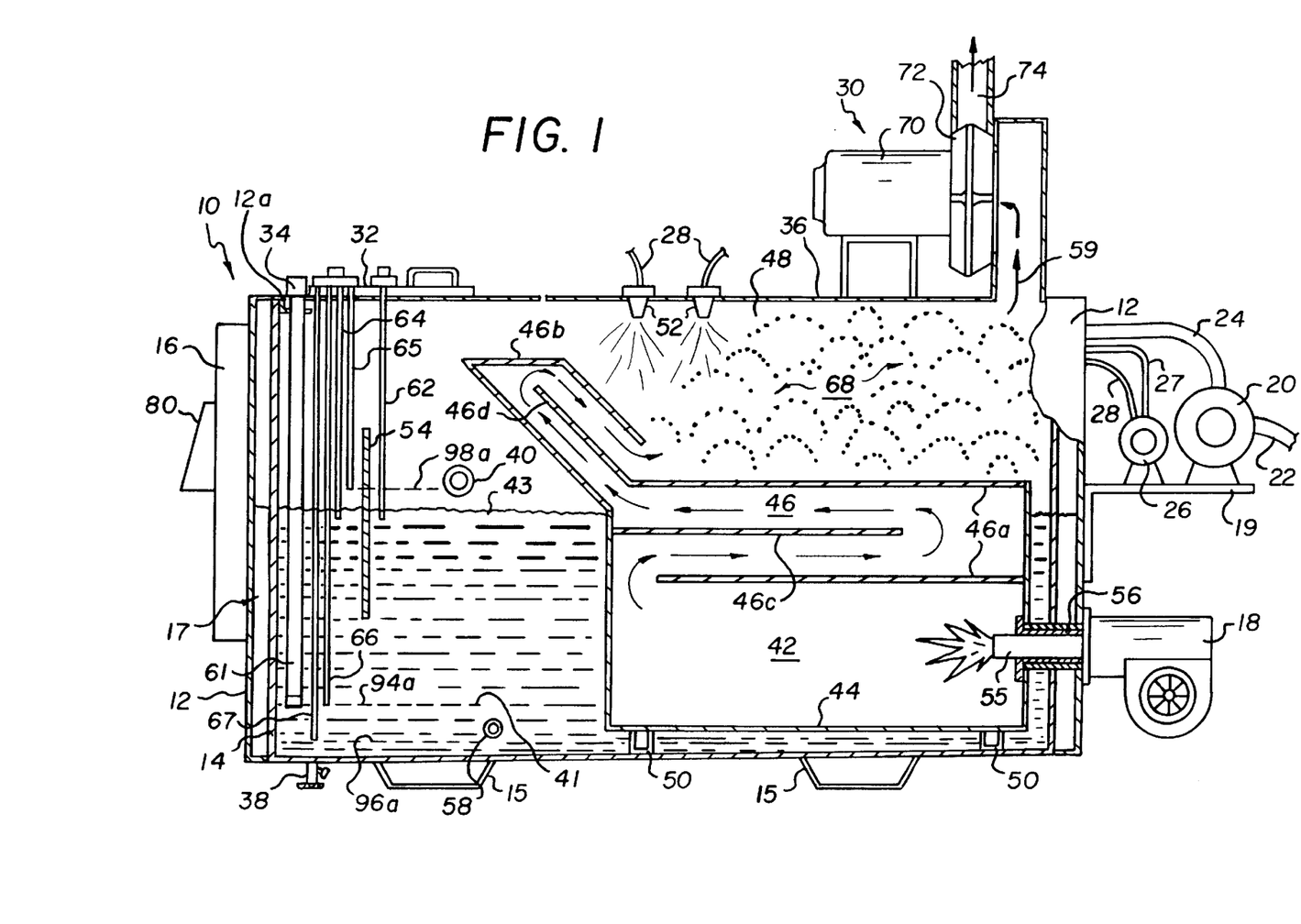
FIG. 1 is a cross-sectional view of a preferred embodiment of wastewater treatment apparatus according to the invention, taken along lines 1—1 on FIG. 2.

Referring to FIGS. 1 through 4, a preferred embodiment of the invention comprises wastewater treatment apparatus 10. Apparatus 10 includes an external jacket 12, made for example of 14-gauge stainless steel, to cover all sides of the apparatus and bent over the side walls of vessel 14, as shown in FIG. 1, to form lips 12a on all four sides of the top of apparatus 10. Lips 12a support, in this case, three access covers as shown by phantom lines in FIG. 4. Contained within jacket 12 is a wastewater receiving vessel 14 with an open top and spaced from about one and one-half to about two inches from each of the four sides of jacket 12 to define an insulating air space 17. Fixed to the bottom of vessel 14 are a pair of supports 15 running the full width of vessel 14 configured, as known in the art, both to support and space the entire apparatus from the floor when in use and to enable the apparatus to be moved by a forklift truck or the like. The apparatus 10 is substantially box-like in shape (for example 38" wide×95" long×61" high), and the vessel 14 is constructed of a rigid sheet steel, preferably a 12-gauge stainless steel for its four sides and a 10-gauge stainless steel for its floor. Mounted as shown at the front of jacket 12 is an operating control cabinet 16 from which an operator can control the apparatus 10. Mounted at the rear is a burner 18 to heat wastewater in vessel 14. Fixed to the jacket 12 above the burner 18 is an equipment shelf 19 on which are positioned a first, or wastewater supply pump 20 and a second, or spray chamber supply pump 26.

First pump 20 is used to pump wastewater at an ambient temperature (for example, 35–85° F.) from a wastewater supply tank (as, for example, shown in FIG. 8a), by means of supply hoses 22 and 24 to the interior of vessel 14 through inlet 25. Second pump 26, as will be described, delivers wastewater from the interior of vessel 14 to a spray chamber, by means of tubes 27 and 28. A sheet metal conduit 29 may be provided to enclose the hoses and tubes, as well electrical wiring from cabinet 16 to burner 18 and pumps 20, 26, in order to present a neat appearance. As will also be described, there are included, and mounted on the top of apparatus 10, a water vapor and burner gas exhaust system 30, a probe mounting fixture 32 supporting a number of apparatus operating and control probes, an oil skimmer 34, and a maintenance cover 36, shown in phantom lines in FIG. 4, on which are mounted exhaust system 30 and spray heads 52.

Figure 4:
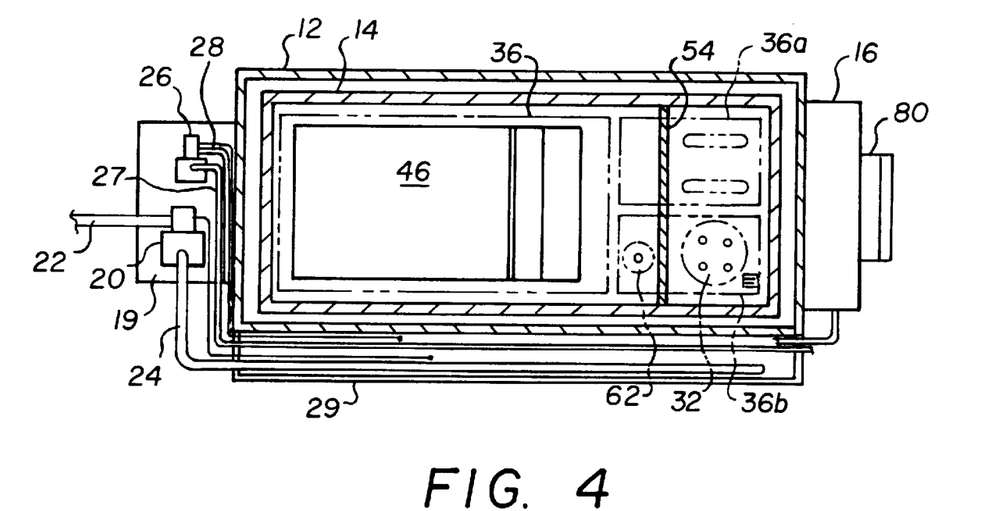
FIG. 4 is a top cross-sectional view of the embodiment of FIG. 1, taken along lines 4—4 on FIG. 3.

There also are provided inspection covers 36a and 36b, also shown by phantom lines in FIG. 4. First cover 36a is easily removed by handles provided for quick inspection of the interior of vessel 14. Second cover 36b comprises a holder for the probe support 32 and skimming apparatus 34, which for maintenance allows the user to remove all the probes and the skimmer assembly either individually or in one step.

Figure 3:
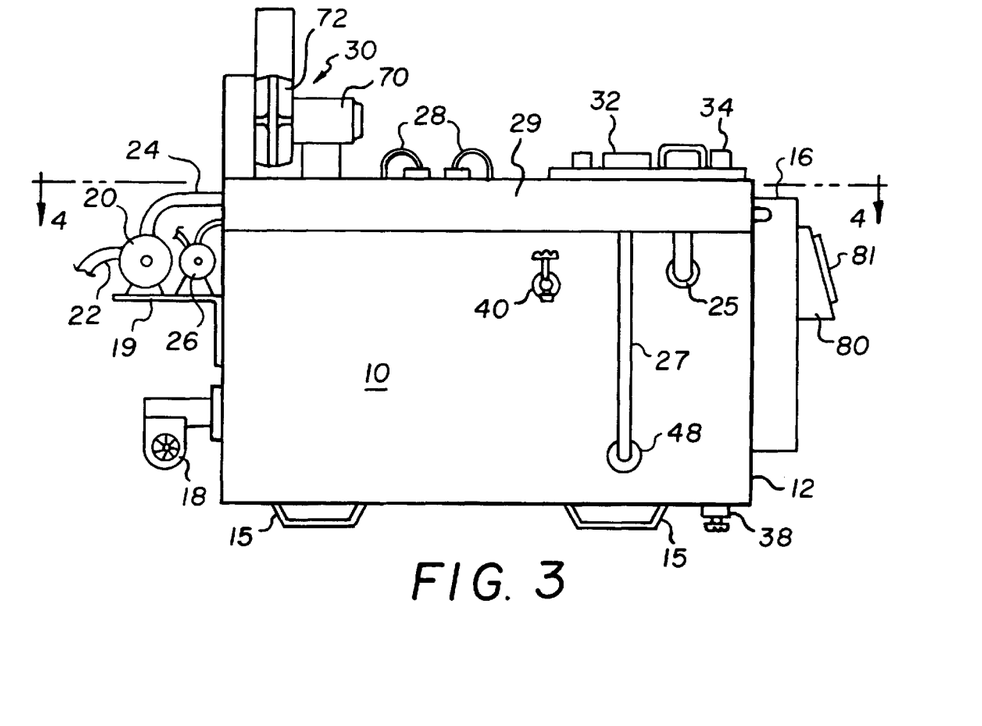
FIG. 3 is an external side view of the embodiment of FIG. 1, showing an exterior side of the apparatus.

As shown in FIG. 3, there is mounted to the bottom of vessel 14 a bottom drain valve 38 to remove, during maintenance, contaminants collecting on the floor of vessel 14. The floor of vessel 14 preferably is sloped, at say ⅛ per foot, downwardly in the direction of drain valve 38 to facilitate contaminate flow in that direction. Also provided is an upper drain valve 40 to expel excess wastewater when, during operation, the water exceeds the maximum level for efficient operation of apparatus 10.

As shown in FIG. 1, the wastewater receiving vessel 14 defines a water heating chamber 41 in which the wastewater is fed by means of first pump 20, until the water reaches an operating level as shown at 43. First pump 20, which preferably is a self-priming pump, such as a Teel cast aluminum centrifugal pump, Model 2P390A, manufactured by Dayton Electric Mfg. Co. of Niles, Ill., also operates to maintain the wastewater at the operating level. Positioned within vessel 14 and spaced from all four sides of vessel 12 is a firebox 44 which defines a burner chamber 42 to contain the flames from burner 18 and thereby heat the wastewater that surrounds firebox 44. The top surface of firebox 44 is comprised of a serpentine heat transfer duct 46, shaped as shown with horizontal section 46a and angled (about 45°) section 46b, each with an air return divider 46c, 46d. Duct 46, which runs the full width of firebox 44, transfers the heated air from burner chamber 42 into a water vapor chamber 48 defined by vessel 14 above the operating level 43 of the wastewater and the angled section 46b. Fire box 44 also is raised above the floor of vessel 14 by supports 50. The fire box 44, duct 46 and supports 50 are made of a material highly resistant to heat and water damage, such as "Corten" or other heat and water resistant alloys. As described earlier, vessel 14 is spaced from jacket 12 by air space 15, both for heat retention and for insulation to maintain jacket 12 at temperatures safe to touch.

At the top of jacket 12 are mounted two spray heads or atomizers 52. The interior of vessel 14 also includes a vessel divider or water baffle 54 mounted across the width of vessel 14 to reduce turbulence in the wastewater during filling and operation. Burner 18, such as a Wayne HSG 400 gas burner manufactured by Wayne Home Equipment of Fort Wayne, Ind., is mounted by a bracket (not shown) to jacket 12, and its operating head 55 passes through vessel 14 and into burner chamber 14 inside a water impermeable cylindrical support 56 mounted between vessel 14 and firebox 44. Burner 18 heats the wastewater in chamber 41 to a predetermined temperature below boiling, for example from about 130° F. to about 210° F., but preferably from about 190° F. to about 205° F., whereas the heated air in burner chamber 42 maintains temperatures ranging, for example, from about 1500° F. to about 2500° F.

Wastewater in the vessel 14, when heated to the predetermined temperature, is then pumped from vessel 14 through outlet 58, by means of second pump 26 and supply tubes 27, 28 to spray heads or atomizers 52, to produce minute particles of water which are vaporized in vapor chamber 48. Second pump 26 may be, for example, a Wanner Hydra-Cel pump, Model F-20, manufactured by Wanner Engineering, Inc. of Minneapolis, Minn.

Heated air from firebox 44 is circulated (shown as arrows 56) through duct 46 and into the vapor chamber 48 directly above. Before being exhausted through outlet 59 of exhaust system 30, the heated air from duct 46 maintains the temperature of the air in the vapor chamber 48 at between about 200° F. to about 600° F., depending on the volatility of contaminants in the wastewater, but preferably from about 350° F. to about 450° F. at which temperatures the wastewater sprayed into chamber 48 by spray nozzles 52 is readily vaporized to be withdrawn as water vapor through exhaust outlet 59 along with the heated air.

As shown in FIG. 1, while the wastewater is in chamber 41 of vessel 14 and is being heated, oil skimmer 34 collects non-volatile fluids such as waste oils from the wastewater. The oil skimmer 34 mounts to the top of jacket 12. Similar to the skimmer described in VanKouwenberg, skimmer 34 comprises a rotating belt 61 which extends into vessel 14 to near its bottom surface and to which oils in the water adhere and are removed by a wiper blade on top of jacket 12 and riding against the outer surface of belt 61. Oil skimmer 34 in itself is a known device, and is available from companies such as Wayne Products, Inc. of Frazer, Pa., ("MiniSkimmer" Model MSB and #600 stainless steel single flat belt). The waste oils are then directed from the wiper blade to a trough for collection in a container (not shown).

A portion of the wastewater sprayed into vapor chamber 48 remains as water droplets, where they spray the uppermost walls of duct sections 45a and 46b to wash any particulates collecting on duct 46 onto the floor of vessel 14. The upper wall of section 46a may also be slightly sloped to facilitate particulates falling to the floor of vessel 14, and its surfaces may but need not be treated with a heat proof non-stick material. All such denser particulates not removed by the oil skimmer thus can be removed by draining the apparatus from bottom drain 38 on the underside of the apparatus 10.

Operation of apparatus 10 is monitored and controlled by a number of probes supported by fixture 32, as shown in FIG. 1. Each of the probes, apart from the combination as provided by this invention, are conventional instruments known to those skilled in the art. The combination according to this invention includes a temperature probe 62 that monitors the temperature of the wastewater in chamber 41 of vessel 14, turns burner 18 on and off to maintain the operating temperature range; and preferably turns pump 26 on and off in response to the water temperature. Operating level probe 64 monitors the wastewater height by shutting off and turning on the first supply pump 20 to maintain the wastewater at its predetermined operating level 43, and is preferably controlled by a known time delay, of say two to five minutes, to prevent instant on-off operation of pump 20. Also shown are a low-level probe 66 to shut down apparatus 10 when the wastewater level reaches the operating low point, an optional "low—low" level probe 67 provided as a redundancy to shut down the apparatus if the low-level probe 66 fails, and an optional high-level probe 65 if probe 64 fails. An acceptable temperature probe 62 is a Pyromation MgO thermocouple assembly supplied by Pyromation, Inc. of Fort Wayne, Ind. Suitable water level probes 64, 65, 66, 67 are stainless steel continuity electrodes, Series 3R and electrode fittings, Series 3E as supplied by Warrick Controls, Inc. of Royal Oak, Mich. All of the probes are electrically connected to switches that can automatically shut down or turn on all or some of the components of the apparatus 10 as certain pre-set parameters are met and as will be described.

Figure 2:
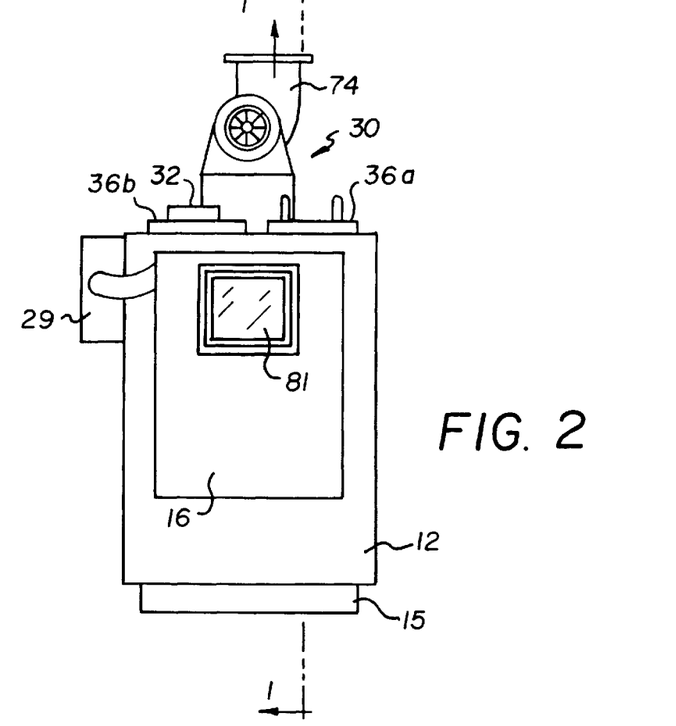
FIG. 2 is an external front view of the embodiment of FIG. 1.
Figure 5A:
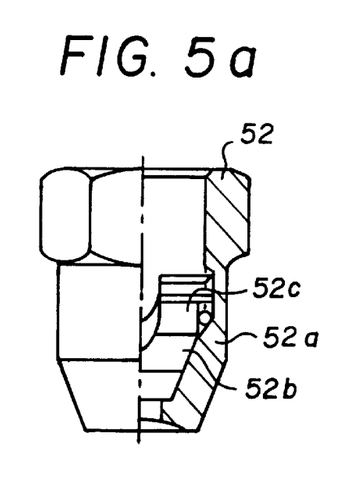
FIGS. 5a and 5b are alternate versions of spray nozzles or atomizers as used in the invention illustrated in FIG. 1.
Figure 5B:
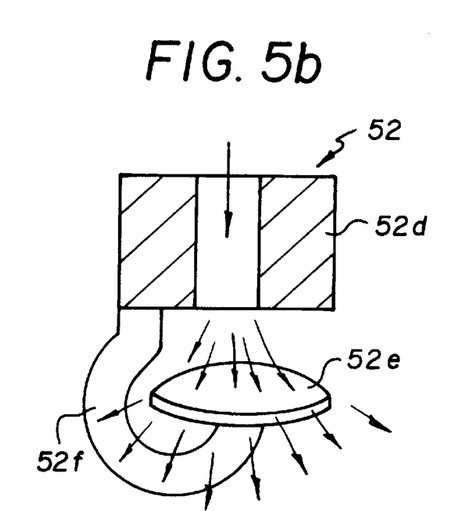

As described earlier, atomizers 52 spray heated wastewater supplied by pump 26 into the vapor chamber 48. Although several different atomizers or spray heads may work, I have found that a baffle cone spray nozzle a shown in FIG. 5a, such as a Lechler Axial-Hohlkegeldüsen KS 0-2, supplied by Technical Products & Services Inc. of Newton, N.J., is particularly suitable. The nozzle in FIG. 5a comprises an internally threaded spray head body 52a tapered at the bottom, with an insert 52b containing two angled holes 52c to expel the water in a cone-shaped spray through a bottom opening in body 52a. An alternate nozzle 52, as shown in FIG. 5b, comprises a nozzle body 52d through which the water is expelled onto a convex spreader 52e attached to body 52d by a arm 52f. As the heated water (190–205° F.) then enters spray chamber 48 (350–450° F.), most of the water is converted into vapor 68 (shown as dotted lines), and any non-volatile contaminants remaining in the heated wastewater fall either onto the floor of vessel 14 or onto the top surface of duct section 46a, from which the particulates are washed onto the floor of vessel 14 by the unvaporized water droplets, for later collection. Exhaust system 30 then draws the vapor 68 (and burner exhaust gases) through exhaust outlet 59 as illustrated in FIGS. 1 through 3.

The exhaust system 30 comprises a motor 70, an exhaust fan 72, and a conventional exhaust pipe 74 as shown. An example of motor 70 and exhaust fan 72 combination is a Cincinnati Exhaust Fan Assembly, part no. 0111 from its Catalog No. PMA-793. The motor 70 and the exhaust fan 72 may be operated in a range of between about 300 cfm and 1000 cfm but preferably at a rate of about 600 cfm to about 800 cfm that creates a negative pressure within the vapor chamber 48. This negative pressure assists both in the rapid conversion of the wastewater released from atomizers 52 into vapor 68 and in drawing the vapor 68 into exhaust pipe 74. The exhaust system cools the heated air and vapor after removed from vapor chamber 48 to temperatures in the range of about 200–300° F., or even lower, for example 165° F. thus adding little heat to the atmosphere.

Figure 6:
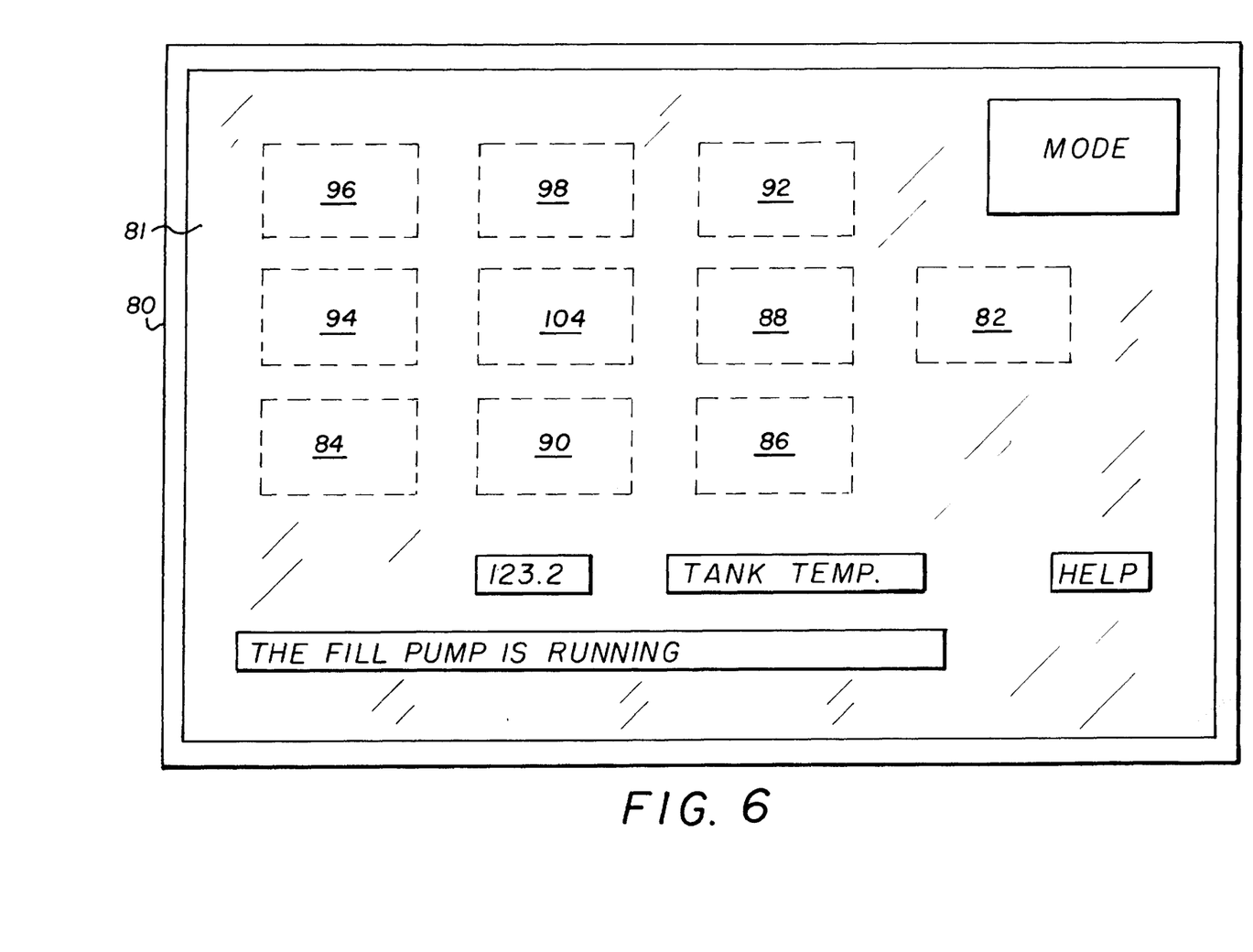
FIG. 6 is a view showing an operating panel as used in the invention.
Figure 8A:
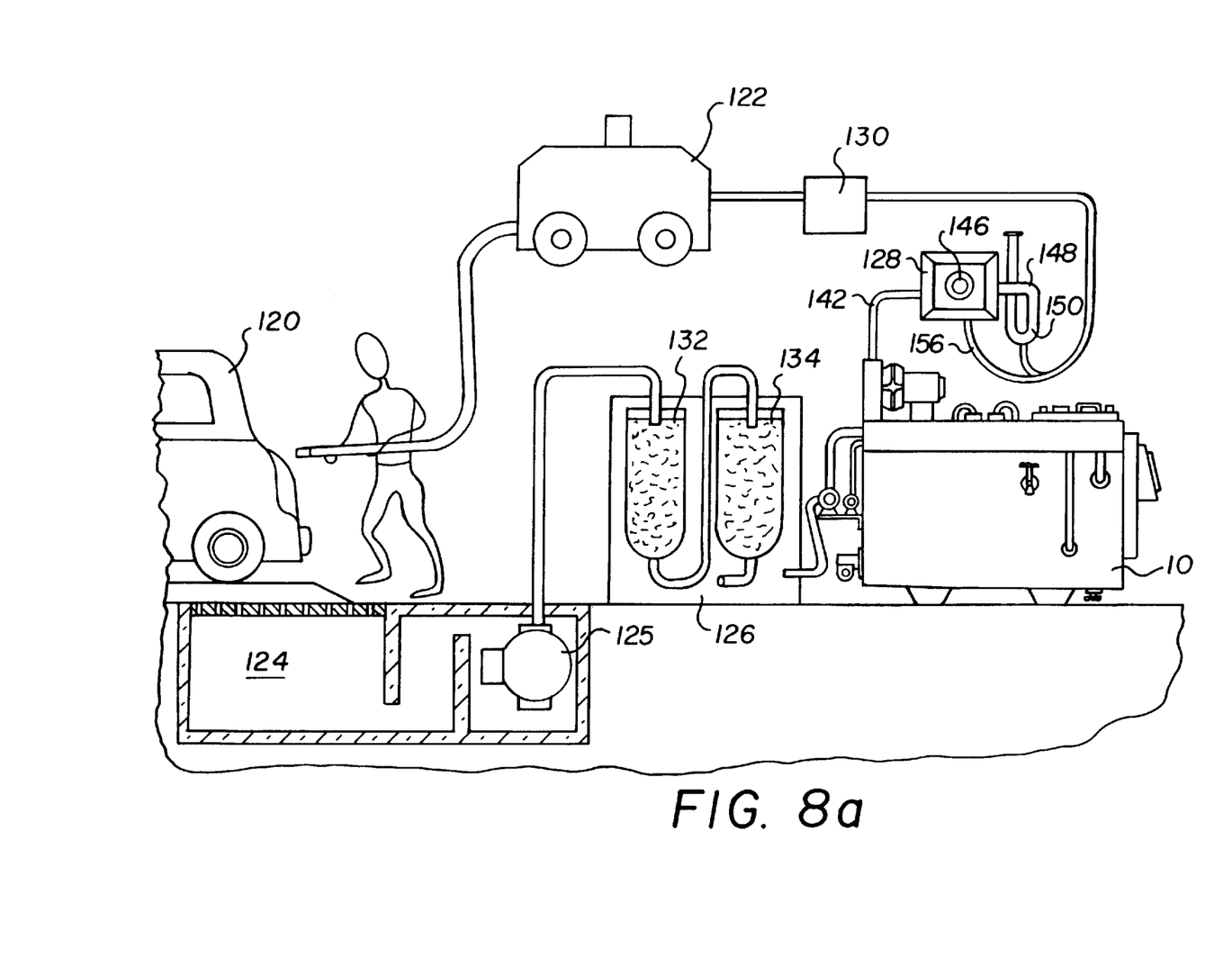
FIG. 8a is a schematic illustration of the apparatus as used in a closed-loop system for washing road and other equipment, collecting and treating the wastewater, and then recovering and reusing the treated water.

There is contained in the electrical cabinet 16 a switch box 80 to control the operating devices. Switch box 80 as shown in FIG. 6 comprises touch panel pad display 81 to control a number of electrical switches or to display the output of automatically controlled switches. Switch box 80 may be a touch screen display unit, such as a Panelmate 1500 by Cutler-Hammer IDT, an Eaton Corporation. The switch box 80 interconnects all switches which are managed by software programmed by means well known to those in the art. Touch pad display 81 also provides reading of the temperatures, volumes of the wastewater in the water vessel 14, the heating chamber 42, the vapor chamber 48, and the available wastewater in the supply as shown in FIG. 8a. A first switch 82 is a master switch which activates the electrical circuitry and also provides a quick shut-down of apparatus 10. A second switch 84 controls first pump 20 and a third switch 86 operates second pump 26. Other switches are low-level probe switch 94, an optional low—low level switch 96 if low—low level probe 67 is used, an optional high-level switch 98 if high-level probe 65 is used, a wastewater supply switch 100, a master burner switch 102, and an interlock switch 104. A fourth switch 88 activates the belt skimmer 34, a fifth switch 90 activates exhaust blower motor 70, and a sixth switch 92 is provided to control burner 18 in response to the temperature probe 62. Each of the switches is connected to their respective units by circuitry 110, but may be programmed to be set at different operating levels and to be operated by programmed software as can be done by those skilled in the art.

Figure 7:
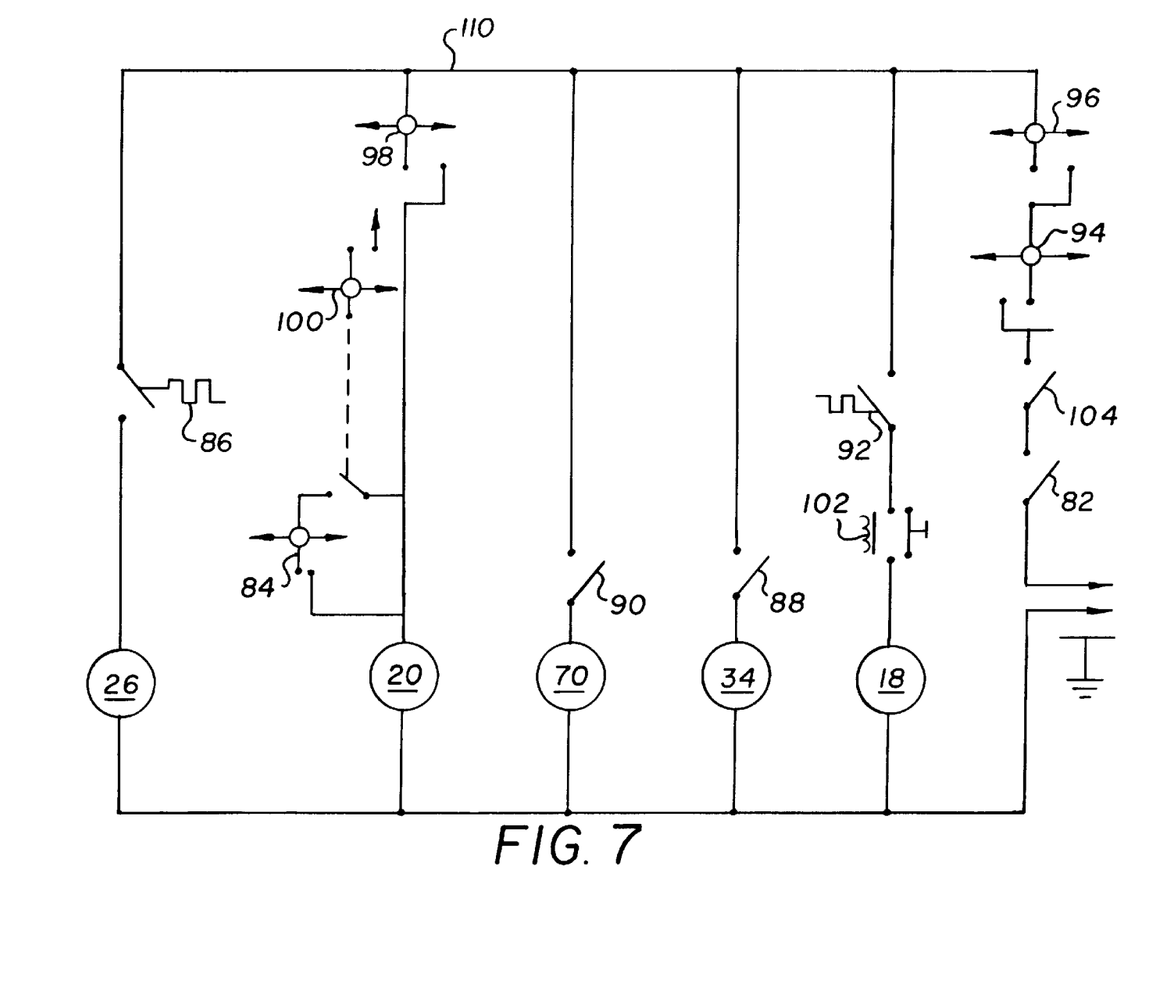
FIG. 7 is a simplified electrical circuit system of the apparatus of FIG. 1.

Circuitry 110, as shown in FIG. 7, controls the heater 18, the first pump 20, the second pump 26, burner 18, oil skimmer 34 and blower motor 70. Power is applied to the apparatus 10 through a three-line electrical wire connecting the apparatus to a 220 volt AC 30-amp power source and the various electrical components. Master control switch 82 is closed when the "start" button is pushed. Low-level and low—low level switches 94, 96 are normally closed, but after a time delay after master switch 82 is closed are programmed to open and shut down operation if after "start" the wastewater level in heating chamber 41 reaches the low or low—low water levels indicated in FIG. 1 by lines 94a and 96a. One or more interlock switches 104 also are provided to shut down operation if any critical element, such as an access door or probe fixture, is not in operating position.

Upon activation of the apparatus by master switch 82, the blower control switch 90 is closed after a brief time delay to operate the exhaust system 30. After sensing operation of exhaust system 30, switch 100 is either manually or automatically closed upon recognition of a wastewater supply, since operating level switch 84 and high level switch 98 are normally closed to complete the circuit to first pump 20. When wastewater is filled in vessel 14 to the operating level 43, at which point switch 84 is opened by the lower tip of operating probe 64 having sensed the water level, to deactivate pump 20. As the water level during operation drops below probe 64, pump 20 is reactivated, but only after the predetermined time interval programmed into switch 84 passes. On the other hand, if switch 84 fails to open at level 43 and pump 20 continues to fill wastewater to level 98a, optional probe 65 causes safety switch 98 to open and deactivate pump 20. Otherwise, any excess wastewater is drained by drain valve 40 back into the wastewater supply.

After a sufficient programmed time delay to permit an operating level of wastewater to be filled into chamber 41, master burner switch 102 is closed. If the temperature in vessel 14 as measured by temperature probe 62 is below the burner cutoff position, say 195° F., then switch 92 as controlled by probe 62 is also closed to ignite burner 18, which remains burning until probe 62 senses the preset, preboiling operating temperature of, say, 195° F. Switch 92, as controlled by temperature probe 62, then alternately opens and closes to shut off and turn on burner 18, as the vessel temperature rises above and falls below the preset temperature, all by a digital temperature controller in a manner well known in the art.

When temperature probe 62 senses the temperature in vessel 14 at a somewhat lower operating level, say 170° F., the programmed logic closes the normally open thermally activated switch 86, as controlled by probe 62, to operate second pump 26 to feed wastewater from heating chamber 41 to vapor chamber 48. In order to operate oil skimmer 34, switch 88 may either be closed manually or closed after a predetermined time delay built into the operating circuit, e.g. about two minutes, after pump 20 is activated. Switch 88 preferably is then opened by a predetermined time delay, e.g., about fifteen minutes, after the wastewater level falls below operating level probe 64, although the time delay is designed to be overridden if additional wastewater is fed to restore the level to operating level 43. Alternatively, switch 88 may be manually opened if the oil drain trough of skimmer 34 is seen not to be removing oil, or automatically opened or closed in response to an optional probe (not shown) at the bottom pulley of skimmer 34 to sense the absence or presence of water covering the bottom pulley.

The electrical circuitry is easily understood by those skilled in the art and can be suitably and safely wired in the apparatus by a skilled heating/ventilation/air conditioning (HVAC) technician, as well as the electrical and electronic controls programmed by programmers skilled in HVAC system controls, using circuit boards, PROMs and control devices known in the art.

In operation, apparatus 10 is turned on by activating the touch panel 81. After a suitable warm-up time, the "Start" icon on the touch pad controller 81 is touched, which activates the exhaust blower motor 70 through switch 90 and first pump 20 to feed wastewater to the vessel 14 until it reaches the operating level as shown at 43. Within one to two minutes after the exhaust blower has been sensed by the programmed logic to be working, the burner master switch 102 is closed and the oil belt skimmer 34 activated. When the temperature in vessel 14 reaches the wastewater spray level e.g., 170°, the spray pump 26 is activated to spray water into vapor chamber 48 and evaporation begins. First pump 20 is turned off when the wastewater reaches level 43, but high level probe 65 and manually opened high limit gate valve 40 are provided to prevent overflow and spillage of wastewater into the vapor chamber 48.

The wastewater fed through pump 26 is sprayed by nozzles 52 directly onto the burner duct 46, and atomized water greatly increases surface area for rapid evaporation. As the wastewater level drops below probe 64 due to evaporation, additional wastewater is automatically fed into heating chamber 41 through reactivation of first pump 20.

After the last of the wastewater supply in a batch is delivered to heating chamber 41, the wastewater level begins to drop from level 43 to the low level. However, because temperature probe 62 now is measuring the air temperature within vessel 14, burner 18 may be cycled more frequently to maintain a vaporizing temperature, which also tends to cause a more gradual drop in fire box temperature to provide a gentle shut down that helps prevent metal fatigue due to overheating. As apparatus 10 evaporates the last of the wastewater in a batch, and the fluid level drops below the low-level sensor probe 66, switch 94 is opened to shut down apparatus 10, although individual elements, such as exhaust system 30, may be programmed to continue operation for an additional time to fully exhaust heated gases from the apparatus.

Figure 9:
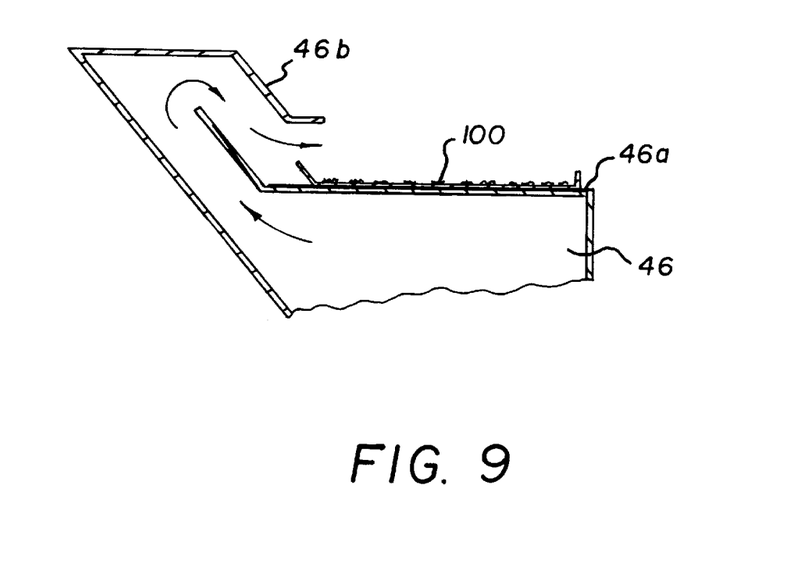
FIG. 9 is an enlarged cross sectional view of a portion of the apparatus to illustrate the use of a contaminant collection pan.

In an alternative embodiment shown in FIG. 9, a removable collector pan 100 may be placed on the top surface of duct 46. The collector pan 100 collects the non-volatile contaminants deposited when the wastewater is vaporized. The collector pan 100 can be placed on or removed from the top of the heating path 46 through inspection cover 36a. Although not shown, there may also be a side door to vessel 14, which provides access to remove from and place the collector pan 150 onto the top surface of duct 46. The door, as with the access covers, may be connected to an interlock switch which will cause apparatus 10, if operating, to shut down. Further, if it is desired to exhaust the heated gases separately from the water vapor, the top of duct section 46 may be closed to vapor chamber 48 and a separate exhaust outlet and exhaust fan provided.

In an alternative embodiment of the present invention, it also is possible in many applications to have the second pump 26 pump the wastewater directly from the wastewater supply through tubes 27, 28 to the nozzles 52 for spraying into the vapor chamber 48. The wastewater, although at ambient temperature, nevertheless can, because of the heat difference in chamber 48, convert the sprayed wastewater into vapor 66 and the non-volatile contaminants settle within vessel 14.

Figure 8B:
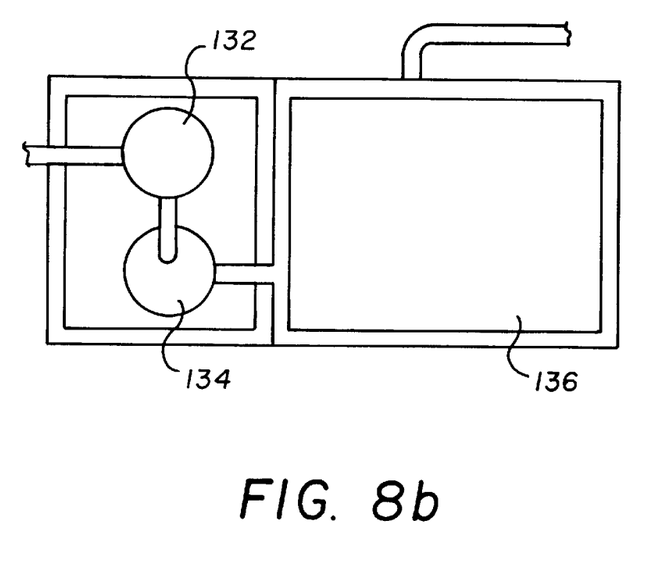

Apparatus 10 can be easily integrated into a closed loop cleaning system as shown in FIG. 8a. For example, a vehicle 120 is cleaned with a conventional water pressure washer 122, which may contain a solvent or a detergent. The water, detergent, and contaminants (collectively called wastewater) cleansed from vehicle 120 fall within a collection area 124. The wastewater is then pumped by submersible pump 125 to the supply 126, preferably the filter supply system as shown in FIGS. 8a and 8b. The wastewater is fed to apparatus 10 and cleansed of the balance of its contaminants in apparatus 10, where it exits and can be recycled by condensing to liquid in condenser 128 and collected in a clean water supply 130 to be reused in the pressure washer 122.

To further improve the efficiency of the present invention, as shown in FIGS. 8a and 8b, wastewater supply 126 includes a filtration system comprising a first filter 132 to eliminate all particulates greater than a certain size, e.g., 100 microns, a second filter 134 to receive filtered wastewater from first filter 132 to eliminate particulates larger than, e.g., 10 microns. The filtered wastewater is then delivered to a wastewater collection chamber 136, from which the wastewater is pumped into vessel 14 by first pump 20, and if desired, also directly to vapor chamber 4 by second pump 26. Filters 132 and 134 are made of materials well known in the art. Either or both of filters 132, 134, but preferably at least second filter 134 is made of an oil specific absorption filter material to capture most of the free and emulsified oils in the wastewater, the oil specific absorption filter material also being well known in the art.

Figure 8C:
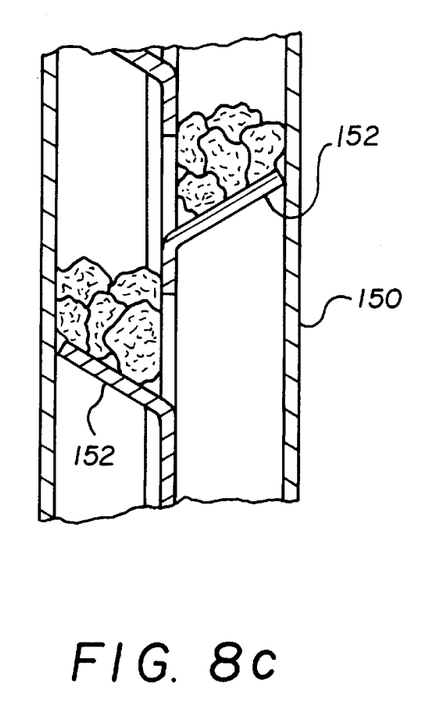

The condenser 128 reduces the expelled vapor to distilled water collects for reclaiming and reuse. Condenser 128 comprises an input 142, finned condensing coils (not shown) cooled by a conventional heat transfer fan 146, and an output system 148. The output system 148 comprises an elbow trap 150 with baffles 152. The fan 72 of exhaust system 30 pushes vapor 66 into the condenser coils. Once the vapor 66 is condensed, the water, as shown in FIGS. 8a and 8c, enters the output system 148 with baffles 152 assisting in condensing the remaining vapor 66 into water and for collection of any volatile contaminants. The baffles 152 may be indentations or waste trapping materials, such as copper wool pads. The condensed water is then pumped from trap 150 from outlet 156 to the desired recycling point, such as the wash water supply 130 shown in FIG. 8a.

Figure 10:
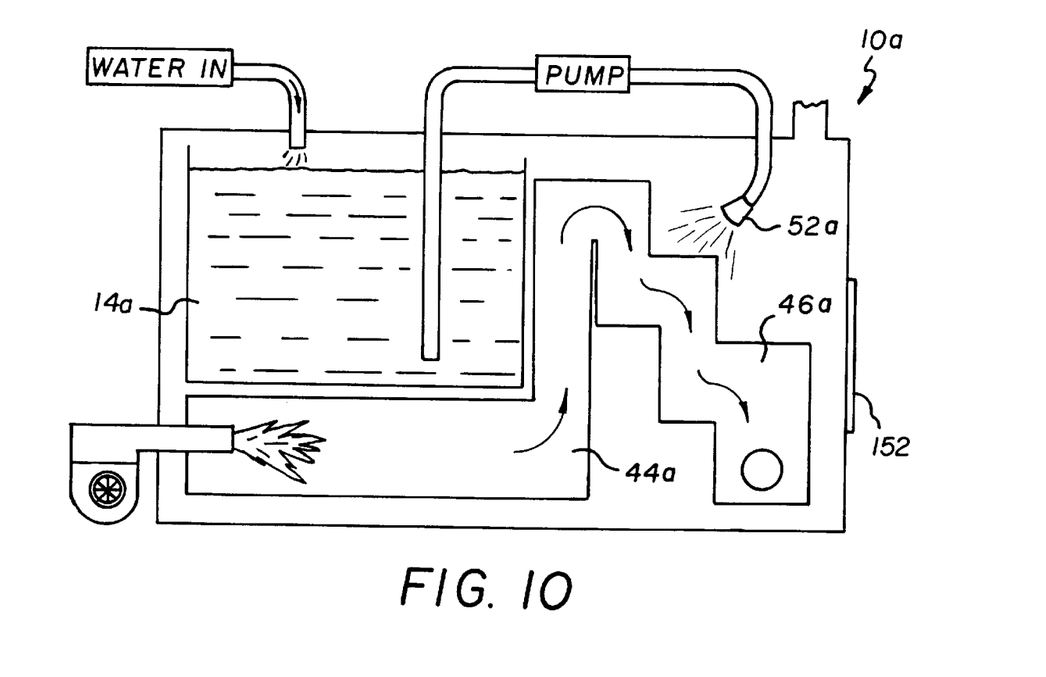
FIG. 10 illustrates an alternative embodiment of the wastewater treatment apparatus according to the invention.

In still another embodiment of the present invention, fire box 44a of apparatus 10a may be positioned outside of and below vessel 14a, and the heat duct 46a may be formed with cascading sections, as shown in FIG. 10. The areas surrounding fire box 44a and duct 46a may suitably be provided with sufficient air space and/or fiberglass insulation (not shown), except for the outer cascade section surfaces of duct 46a, the temperature of which is sufficient to vaporize wastewater sprayed onto the surfaces by nozzle 52a. The cascading sections of heating duct 46a increase the heated surface area for vaporizing the water, and contaminates settling on duct 46a and the floor of apparatus 10a may then be removed through access door 152.

It is to be understood that the aforementioned description is illustrative only and that changes can be made in the apparatus, in its components and their functions, and in the sequence of combinations and process steps, as well as in other aspects of the invention discussed herein, without departing from the scope of the invention as defined in the following claims.

What is claimed is:

1. Apparatus for treating wastewater comprising a vessel defining a wastewater heating chamber to receive wastewater from a wastewater supply; filling means for delivering wastewater to the heating chamber; means for heating the wastewater in the heating chamber to below the boiling point of water; means defining a vaporizing chamber; atomizer means for spraying the wastewater into and forming particles of the sprayed wastewater in the vaporizing chamber; heat duct means for transferring heat from the heating means to the vaporizing chamber for heating the vaporizing chamber to a temperature sufficient to convert the sprayed wastewater into water vapor; means for collecting contaminants deposited by the wastewater as it is vaporized; exhaust means for removing the water vapor from the vaporizing chamber; and circuit means including control switches for controlling the filling means, heating means, spraying means and exhaust means, the circuit means further including control panel means for displaying and adjusting operating parameters of the filling means, heating means, spraying means and exhaust means.

2. Apparatus according to claim 1 wherein the exhaust means includes means for creating a negative air pressure in the vaporizing chamber to facilitate conversion of the sprayed wastewater into water vapor.

3. Apparatus according to claim 1 wherein the heating means and the duct means are contained within the vessel, and the vaporizing chamber is defined by the vessel and the duct means.

4. Apparatus according to claim 3 wherein the heating means comprises a firebox with top, side and bottom walls to define a burner chamber and at least at its side and bottom walls surrounded by wastewater in the heating chamber, the heating means further comprising burner means for heating air within the firebox, and wherein the duct means comprises the top wall of the firebox and transfers heated air from the firebox to the vaporizing chamber.

5. Apparatus according to claim 1 and further comprising control means in the heating chamber for monitoring the temperature of the wastewater in the heating chamber and for controlling the heating means to maintain the temperature in the heating chamber from about 130° F. to about 210° F.

6. Apparatus according to claim 5 in which the vaporizing chamber is maintained at a temperature from about 200° F. to about 600° F.

7. Apparatus according to claim 1 and further comprising means for filtering particulates exceeding about ten microns in size and/or free and emulsified oils from the wastewater before delivery of the wastewater to the heating chamber.

8. Apparatus according to claim 1 and further comprising means for controlling the level of wastewater in the heating chamber, means for deactivating the apparatus at a predetermined low wastewater level, and means for discharging excess wastewater from the heating chamber at a predetermined high wastewater level.

9. Apparatus according to claim 1 and further comprising control means for vaporizing the wastewater at a rate about equal to the rate that the filling means delivers wastewater to the heating chamber.

10. Apparatus according to claim 1 and further comprising pump means to deliver heated wastewater from the heating chamber to the spraying means.

11. Apparatus according to claim 1 and further comprising means for receiving and condensing for reuse the vapor removed by the exhaust means.

12. Apparatus for treating wastewater comprising:
(a) a water vessel having at least bottom and side walls defining a heating chamber to collect wastewater from a wastewater supply;
(b) a jacket surrounding at least the side walls of the vessel, the jacket and side walls of the vessel defining an air space between them to insulate the jacket from excess heat;
(c) first pump means for delivering the wastewater to the heating chamber until the wastewater reached a predetermined operating level in the heating chamber;
(d) means for heating and maintaining the temperature of the wastewater in the heating chamber below the boiling point of water from about 130° F. to about 210° F.;
(e) means defining a vaporizing chamber;
(d) means including second pump means and atomizer means for delivering to and spraying wastewater into and forming particles of the sprayed wastewater in the vaporizing chamber;
(e) heat duct means for transferring heated air from the heating means to the vaporizing chamber for heating the vaporizing chamber to a temperature from about 400° F. to about 600° F. to vaporize the wastewater sprayed into the vaporizing chamber to convert the wastewater to vapor;
(f) means comprising a tray for collecting contaminants deposited by the wastewater as it is vaporized, and
(g) exhaust means for removing the water vapor from the vaporizing chamber.

13. Apparatus according to claim 12 wherein the heating means comprises a firebox with top, side and bottom walls to define a burner chamber and at least at its side and bottom walls surrounded by wastewater in the heating chamber, the heating means further comprising burner means for heating air within the firebox, and wherein the duct means comprises the top wall of the firebox and transfers heated air from the firebox to the vaporizing chamber.

14. Apparatus according to claim 13 wherein the duct means comprises a first horizontal section containing a divider to cause the heated air to pass from the burner chamber through the first section in at least two horizontal directions, and a second angled section containing a second divider to receive the heated air from the first section and to cause the heated air to pass through the second section in at least two additional directions and into the vaporizing chamber.

15. Apparatus according to claim 13, comprising means for deactivating the apparatus if the wastewater level reaches a predetermined low level; means for discharging excess wastewater from the heating chamber if the wastewater reaches a predetermined high level; and further comprising circuit means including control switches for controlling the first pump means, heating means, second pump means and exhaust means, the circuit means further including control panel means for displaying and adjusting operating parameters of the first pump means, heating means, second pump means and exhaust means.

16. Apparatus for treating wastewater comprising a vessel defining a wastewater heating chamber to receive wastewater from a wastewater supply: filling means for delivering the wastewater to the heating chamber; means contained within the vessel for heating the wastewater in the heating chamber to below the boiling point of water, the heating means comprising a firebox with top, side and bottom walls to define a burner chamber and at least at its side and bottom walls surrounded by wastewater in the heating chamber, the heating means further comprising burner means for heating air within the firebox; means defining a vaporizing chamber; atomizer means for spraying the wastewater into and forming particles of the sprayed wastewater in the vaporizing chamber; heat duct means comprising the top wall of the firebox and transferring heated air from the firebox to the vaporizing chamber for heating the vaporizing chamber to a temperature sufficient to convert the sprayed wastewater into water vapor; means for collecting contaminants deposited by the sprayed wastewater as it is vaporized; and exhaust means for removing the water vapor from the vaporizing chamber; the vaporizing chamber being defined by the vessel and the duct means: and the duct means comprising a first horizontal section containing a divider to cause the heated air to pass from the burner chamber through the first section in at least two horizontal directions, and a second angled section containing a second divider to receive the heated air from the first section and to cause the heated air to pass through the second section in at least two additional directions and into the vaporizing chamber.

17. Apparatus according to claim 16 wherein the exhaust means includes means for creating a negative air pressure in the vaporizing chamber to facilitate conversion of the sprayed wastewater into water vapor.

18. Apparatus according to claim 16 and further comprising control means in the heating chamber for monitoring the temperature of the wastewater in the heating chamber and for controlling the heating means to maintain the temperature in the heating chamber from about 130° F. to about 210° F. and the temperature in the vaporizing chamber from about 200° F. to about 600° F.

19. Apparatus according to claim 16 and further comprising control means for vaporizing the wastewater at a rate about equal to the rate that the filling means delivers wastewater to the heating chamber, the control means including means for controlling the level of wastewater in the heating chamber, means for deactivating the apparatus at a predetermined low wastewater level, and means for discharging excess wastewater from the heating chamber at a predetermined high wastewater level.

20. Apparatus according to claim 16 and further comprising pump means for delivering heated wastewater from the heating chamber to the spraying means.

* * * * *